United States Patent [19]

Lemelson et al.

[11] Patent Number: 4,611,209

[45] Date of Patent: Sep. 9, 1986

[54] NAVIGATION WARNING SYSTEM AND METHOD

[76] Inventors: Jerome H. Lemelson, 48 Parkside Dr., Princeton, N.J. 08540; Christian Grund, 2035 Burr Ave., Bronx, N.Y. 10461

[21] Appl. No.: 84,426

[22] Filed: Oct. 12, 1979

[51] Int. Cl.$^4$ .............................................. G01S 13/93
[52] U.S. Cl. .................................. 343/6.5 R; 343/455; 343/357; 343/5 MM
[58] Field of Search ............ 343/5 MM, 6 A, 100 ST, 343/6.5 R, 357; 434/3, 4, 2

[56] References Cited

U.S. PATENT DOCUMENTS

| | | | |
|---|---|---|---|
| 3,246,326 | 4/1966 | Mehron | 343/5 MM |
| 3,384,891 | 5/1968 | Anderson | 343/100 ST X |
| 3,514,521 | 5/1970 | Burchard et al. | 434/2 |
| 3,534,367 | 10/1970 | Laughlin et al. | 343/357 X |
| 3,544,995 | 12/1970 | Bottenberg et al. | 343/6 A |
| 3,742,495 | 6/1973 | Diamantides | 343/5 MM |
| 3,774,215 | 11/1973 | Reed | 343/100 ST X |
| 3,890,616 | 6/1975 | Kojima et al. | 343/5 MM |
| 3,900,847 | 8/1975 | Steele | 343/455 X |
| 3,941,984 | 3/1976 | Chappell et al. | 343/357 X |
| 3,993,997 | 11/1976 | Jackson | 343/455 |
| 4,019,179 | 4/1977 | Sivertson, Jr. | 343/5 MM |
| 4,286,270 | 8/1981 | Veselkov et al. | 343/352 X |

Primary Examiner—Salvatore Cangialosi
Assistant Examiner—John B. Sotomayor

[57] ABSTRACT

A navigation warning system and method for vessels includes one more earth satellites which electro-optically scan whole bodies of water whose signals are analyzed by a computer either on a satellite or at a ground location. The analyzing computer includes a memory which contains coordinates of hazardous ocean conditions. The computer automatically analyzes images generated by vessels travelling within the scanned area and detects when two vessels are on a collision course. Automatic visual and sound indication including a voice recording reproduction unit alerts vessel operators of impending collision conditions. The system may include automatic control of the vessel in response to signals generated by the computer for either modifying the control signals or supplying the computer with information transmitted thereto from the satellite and generated either by analyzing computer in the satellite or by the ground location which is in communication with the satellite and receives information generated by the electro-optical scanner.

20 Claims, 5 Drawing Figures

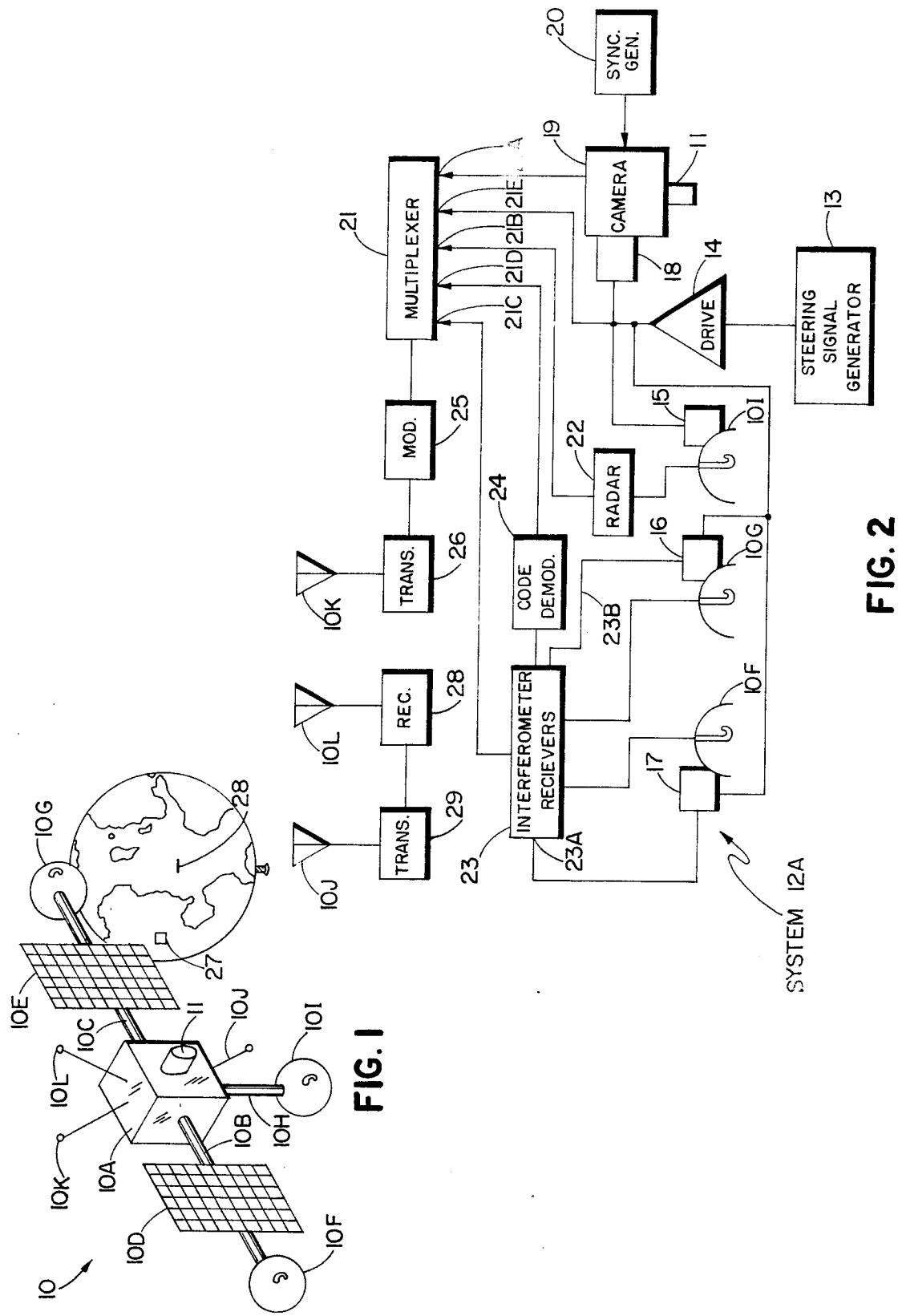

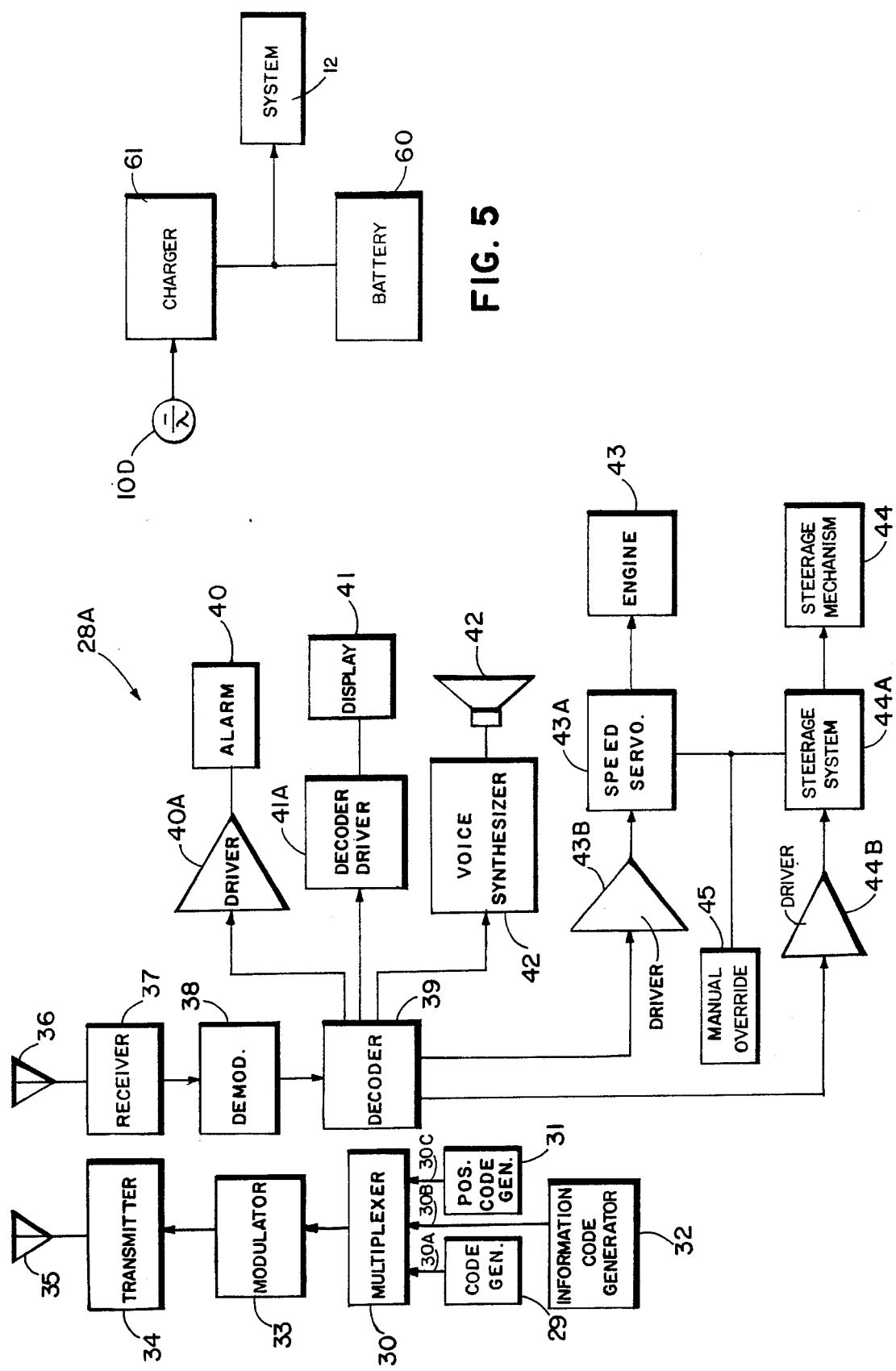

NAVIGATION WARNING SYSTEM AND METHOD

SUMMARY OF THE INVENTION

This invention relates to a system and method for either effecting the navigation of ocean going vessels, modifying the navigation thereof or generating warning signals for persons who navigate ocean going vessels, for the purpose of rendering ocean travel safer by preventing collisions between ships, ships and underwater objects, shoals or reefs, etc. In particular, the system employs a satellite communication system for communicating between ocean going vessels and computing means located in a satellite, on the shore or on the vessel to provide information for controlling the vessel or warning the navigator of the vessel of hazardous conditions.

In one form of the invention, an earth satellite in stationary or moving orbit, scans a body of water such as a portion of an ocean, sea, bay or lake by means of a photo-optical device such as a television camera and/or a radar scanning device, the output signals of which are transmitted to a computer located in the satellite or at a shore located station which is in communication with the satellite, which computer contains signal digitizing means which is operable to digitize the field generated and scanned and to perform operations for discriminating such objects as ocean going vessels and, in certain instances, stationary objects such as man made structures, reefs or other objects which may or may not be charted and which are provided in the computer memory to be compared in location with the location of the vessel's detector during scanning. In other words, the system preferably includes a memory subsystem containing information recorded therein which is indicative of the locations of objects situated above and below the surface of the ocean or body of water under surveillance, and of shallow water locations and other hazardous conditions which are more or less permanently associated with the body of water under surveillance. Such information, when analyzed by the computer receiving the information generated in scanning the body of water and containing image or radar information indicative of vessels traveling such body of water, is employed by the computer which thereafter generates signals which are utilized to perform one or more functions such as controlling the operation or navigation of vessels and/or the activation of warning devices for warning vessel operating personnel or the provision of information in code form for use by computing means on the vessels and/or located at land stations.

In a modified form of the navigation warning system and method, the techniques involved may be employed to guide and prevent collisions between aircraft, aircraft and obstacles and hazardous atmospheric conditions such as abnormal weather conditions wherein either all aircraft in a given zone are scanned by one or more television cameras in one or more earth satellites, the outputs of which TV cameras are analyzed after the picture signals thereof are digitized for computational purposes such as indicating the locations of the aircraft scanned, their direction of travel, altitude (as obtained by radar or from transmitters in each aircraft transmitting altimeter information) and weather conditions, etc.

The information may be computed in the satellite and/or the aircraft or a ground station and relayed to the aircraft for voice playback warning or digital signal warning to the pilot(s) and/or for automatically controlling the aircraft. Such system may be modified and applied for military purposes to warn, by means of satellite scanning of enemy and friendly aircraft, etc.

Accordingly it is a primary object of this invention to provide a new and improved navigation warning system and method for assuring the safe travel of ships at sea.

Another object is to provide a navigation warning system for ships at sea which employs satellite observation and scanning of sea going vessels to detect and define the locations of vessels using the system.

Another object is to provide a method.for detecting when two or more seagoing vessels are on a collision course and either warning the operators of the vessels or correcting their courses or the course of at least one of the vessels to prevent their collision.

Another object is to provide a system and method for detecting when seagoing vessels are on courses which are hazzardous or approach hazzards such as reefs, shoals, wrecks, low water and other hazzards, and warning the operators of such vessels of such conditions to prevent damage or wrecking of the vessels.

Another object is to provide a navigation system and method for operating sea going vessels in a safe manner.

Another object is to provide a navigation system and method for operating sea going vessels without the need for human attendance during at least a portion if not all of its travels between ocean points or ports.

With the above and such other objects in view as may hereinafter more fully appear, the invention consists of thw novel constructions, combinations and arrangements of parts and the subsystems and methods employed in providing an automatic navigation warning system as will be more fully described and illustrated in the accompanying drawings but it is to be understood that changes, variations and modifications may be resorted to which fall within the scope of the invention as claimed.

In the drawings:

FIG. 1 is a isometric view of an earth observing and scanning satellite in stationery orbit above the earth, FIG. 2 is a schematic diagram of the scanning and communication system employed with the earth satellite of FIG. 1.

FIG. 3 is a schematic d agram of the elect onic short wave receiving and transmitting system associated with an ocean travelling vessel subscribing to the navigation system which includes the system of FIG. 2 and satellite of FIG. 1.

FIG. 5 is a schematic diagram of a system for maintaining a source of electrical power for powering the systems of FIGS. 2-4.

Figure 4:
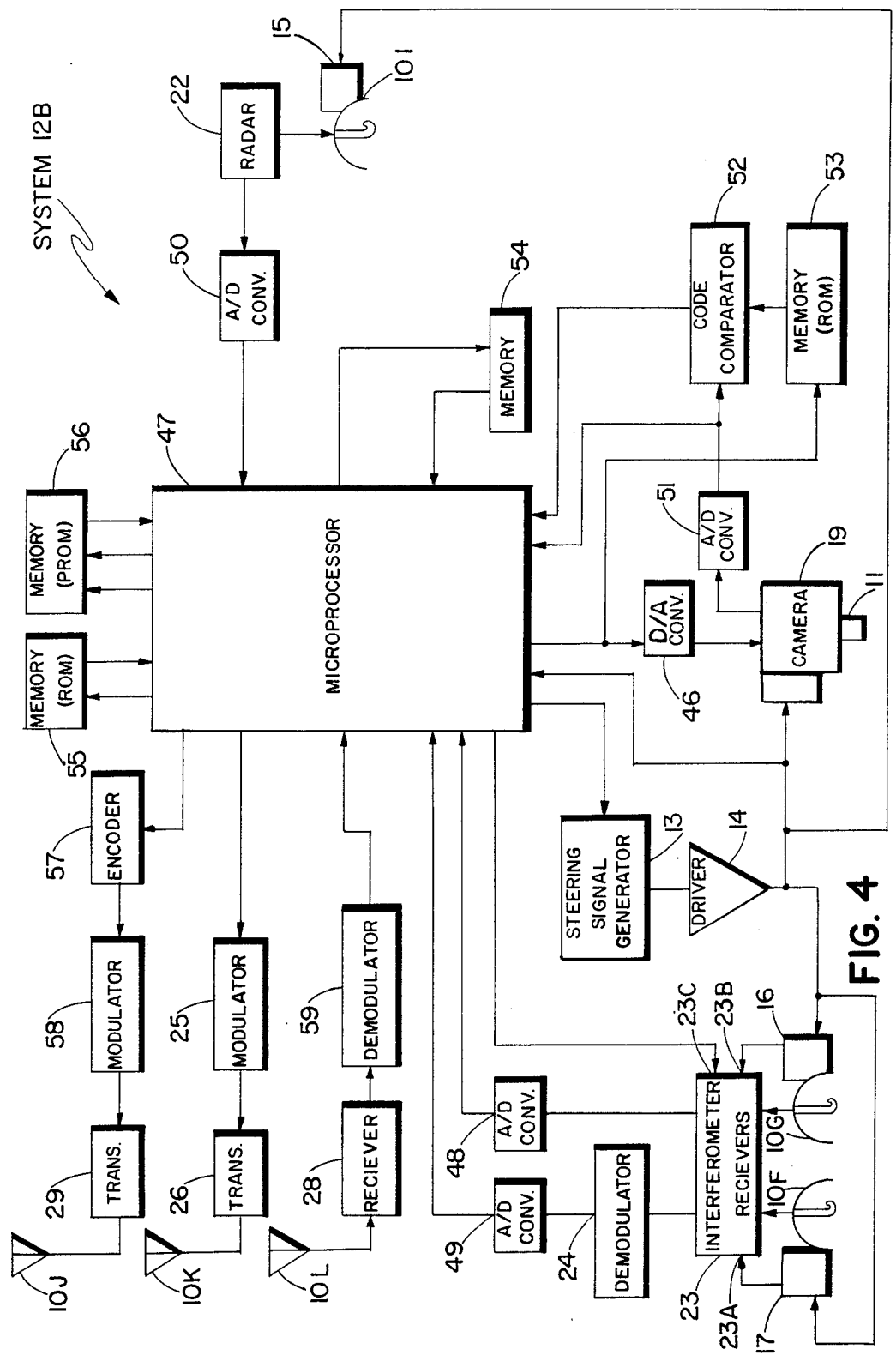
FIG. 4 is an electronc diagram of a modified form of the system shown in FIG. 3.

In FIG. 1 is shown details of the major components of a navigational warning and control system 10 defining the instant invention. An earth satellite 10S is shown in the geo-stationary orbit above the earth, which satellite includes an electronics housing 10A, support arms 10B and 10C to which are attached solar collector panels 10D and 10E and interferometer antennas 10F and 10G, an additional support art 10H which supports a radar generator and antenna 10J and a number of protruding antennas denoted 10K, 10L and 10M.

The satellite 10S is shown in geo-stationary non-synchronous orbit above the earth and is operable to scan a body of water within the view of a lens 11. A number of electronic systems defining the satallite electronics are provided herein and include two exemplary presentations.

In FIG. 2 is shown one such construction for the satellite navigational and warning system 12, which is denoted 12A in this particular embodiment. A signal generator 13 provides steering signals to a driver 14 for application to an antenna steering means 15, 16 and 17 and a television camera steering system 18, which systems may be mechanical and employ, for example, reversible gear motors or may comprise electronic means such as phased array switching means. The steering system allows the antennas and the camera 18 to simultaneously pan the area of the earth to be covered or scanned thereby. An image representing the scanned area of earth or sea, is input to a television camera 19 which scans the area under surveillance at a rate in accordance with the operation of a sync signal generator 20, wherein such camera outputs a composite video picture signal to an input 21 A for a multiplexing circuit 21.

Similarly, a radio frequency radar system, which may be supplemented or replaced by a laser radar system or any other type, is composed of a transceiver 22 and an antenna 10I which is directed by steering means 15 and which generates output signals representing the image areas scanned, which output signals are input to a multiplexer 21 through an input port 21B, is also provided.

An interferometer type receiver 23 is also provided for receiving signals from antennas 10F and 10G, which are respectively directed by steering mechanisms 16 and 17, each of which antennas has position sensors incorporated within the position signals generated which are received by the interferometer 23 through inputs 23A and 23B. An output of receiver 23 representing the precise position of the point of transmission of its received signals, is conducted to a multiplexer 21 through an input port 21C. A code demodulator 24 separates the coded transmission of the received signals and also inputs such signals to the multiplexer 21 through an input 21D.

A signal representing the position of all steerable elements of the system 12A, originated from the signal generator 13, is input to multiplexer 21 through input port 21E. The multiplexer 21 sequentially connects its inputs to a modulator 25 which modulates transmitter 26, the output of which is radiated on an antenna 10K. The signals so transmitted are received by the short wave receiver of a ground station 27 and are processed for automatically determining the potential hazards to ocean travelling vessel 28V, the detection of which results from processing the signals generated by the interferometer 23.

If a potential hazard is detected by the computer of ground station 27, coded signals are transmitted thereby to the sattelite 10, which signals are intercepted by the antenna 10L and are conducted to a receiver 28 for subsequent application to and transmission by transmitter 29 on antenna 10J to the vessel or ship. Such coded signals are preceded by a unique vessel identification code to activate a respective identification circuit forming part of the computer of the vessel, wherein each vessel has a different registration code which is generated prior to the transmission of information from the vessel to the satellite so as to provide a unique vessel identifying signal or signals which form part of the total transmitted information which is picked up by the interferometer 23 of the satellite as described. Such unique vessel identification code thereby serves as an automatic means for recognizing the particular vessel 28 of all the vessels in the system and particularly provides information for locating the different vessels under surveillance.

In FIG. 3 is shown details of the electronic system 28A, which is located on board each vessel 28 in the system. A code generator 29, for each vessel, is operable to generate a code unique to the particular vessel, and has its input connected to an input 30A to a multiplexer 30, and along with the output of a position code generator 31, provides a coded representation of the vessel and its position as obtained by plotting by the crew of the ship or by automatic plotting means connected to an input port 30B and to a third code generator 32 for generating a coded representation of the vessel's operation or any other operation desired to be transmitted to the input port 30C. Multiplexer 30 subsequently connects the code generator to a modulator 33 which is connected to transmit such codes on a short wave transmitter 34 having an antenna 35 which is operable to short wave transmit such codes to the satellite 10 as described.

An antenna 36 receives warning signals retransmitted by the satellite 10, which originally eminated from the ground station 27 and passes such codes to a receiver 37 to which is connected a demodulator 38 which separates the information signals from their carrier signals and applies such information signals to a decoder 39. Decoder 39 may be operable to control any one or more of such devices as an alarm 40, a display 41, a speaker 42, a motor or engine 43, a ship steerage mechanism 44 or other suitable device. Alarm 40 is driven by an alarm driver 40A and may serve to warn ship personnel of impending dnager by visual display or audible means, or a combination of both. Display 41 is driven by decoder driver 41A and serves to display the particular hazard or condiction or may do so by controlling a printer, map generator or video display to display one or more images which represent the area scanne by the satellite 10 or a number of such satellites. A loud speaker 42S is driven by a voice synthesizer 42A which may verbally announce a danger and/or may provide spoken commands to effect the rectification of a dangerous or impending hazardous situation. Such synthesizer may comprise a digital synthesizer, such as the Texas Instruments TMC0280 or a magnetic tape recorder or the like for playing back selected verbal messages. Additionally, signals from decoder 39 may control a servo mechanism 43A, by means of a driver 43B which serves to control the speed of the vessel and a servo mechanism 44A, through driver 44B which serves to control the steering of the vessel so as to effect automatic operation and navigation. Also provided is a manual override mechanism 45 which is operable by the ship personnel, who may take over control of the vessel in the event that it is deemed necessary.

In FIG. 4 an alternate construction of system 12 is provided which is denoted system 12B. Camera 19 and antennas 10F, 10G and 10K are all panned synchronously and operate in a manner similar to the operation of the corresponding units provided in system 12A. Synchronizing signals for the camera 19 are derived from an analog-to-digital converter 46 receiving control signals developed by a computer or microprocessor 47. The microprocessor 47 is constructed to also provide predetermined control of the panning motions of the camera and antennas by providing signals for controlling a signal generator 13. The outputs of the interferometer 23, the demodulator 24 and a radar unit 22, all operating as described in the operation of system 12A, are converted to digital form by analog-to-digital converters denoted 48, 49 and 50 and are respectively applied to the microprocessor 47.

When a vessel 28V containing a system 12B of the type described, is detected by system 12B, it causes microprocessor 47 to activate the television camera 19 which automatically scans the area of interest in the vicinity of vessel 28. The output video signal of the camera 19 is digitized by an analog-to-digital converter 51 and the digital signals generated are applied to a code comparator 52 which compares the visual information derived from the camera 19 with information recorded in a read-only memory 53 and defining conditions within a similar area of ocean, which read-only memory is scanned to generate such information as electrical signals in synchronization with the operation of camera 19, the latter receiving its addressed signals from the microprocessor 47 to assure such synchronization. If a non-identification condition exists between the area scanned by the camera and the information reproduced from recordings in the memory 53 which are representative of such area, the comparator 52 notifies the microprocessor 47 of such condition and the microprocessor then activates a radar unit 22 and a read-only memory 54. The interferometer 23 may also be automatically tuned by a control signal from the microprocessor 47, via an input port 23C, to the frequency of the radar unit 22, thus allowing a greater precision in the measurements made by the interferometer additional such information so obtained by such means may be made available for evaluation by the microprocessor 47.

Memory 54 contains a series of conditions and signatures for both the visual scenes and radar scenes that are possible for different types of instructions which might exist such as other ships, wrecks, shoals, reefs, storms and the like, and thus is used by the microprocessor 47 to identify the nature of the discordance in accordance with signals received from such memory.

Also shown is a read-only memory 55 which may contain information about permanent obstructions to travel, such as reefs, shoals, islands, wrecks and other geographical structures and such information mayb be compared with the position information received by the interferometer to provide a warning of such obstructions to the crew of the vessel.

A programmable read-only memory 56 is also provided which may store short-time location information, which is either derived from the microprocessor during its previous scan or from ground station 27, as described, and which is similarly compared to the location of the vessel with similar subsequent danger warnings generated, if necessary. The system described may also compare the relative positions of the various ocean going vessels with that being scanned and provide a warning or position information of the relative proximity of such vessels to each other and particularly the ship under surveillance. Such warning signals are sent by short wave to the system 28A for the microprocessor 47 of a particular vessel 28, through an encoder 57, a modulator 58 and a transmitter 29.

System 12B may also be kept in two-way contact with the ground station 27 by means of a transmitter 26 having an antenna 10L and a modulator 25 and receiver 28, which are all connected to the microprocessor 47. Such link may serve to permit the ground station 27 to program the memory 56 with pertinent data and may also keep the personnel of the station 27 advised of obstructions, weather conditions and the condition of the system 12B.

Suitable power supply means may be derived from solar energy chargeable batteries 10D and 10E as illustrated in FIG. 5. The solar powered batteries 10D and 10E are used to keep a rechargeable battery 60 fully charged, via charge current regulator 61.

It is also noted that the system described and illustrated in the drawings may be utilized, with suitable modifications, to scan and guide, navigate or warn other vehicles such as aircraft and ground travelling vehicles of hazzardous conditions such as collision courses, ground hazzards, weather hazzards, or other hazzards.

In a particular form of the invention, the systems illustrated in the drawings and hereinabove described may be particularly programmed to warn ocean vessels, land vehicles or aircraft of particular military hazzards or obstacles to travel such as land and sea mines known to the memories of the satellite, the land station(s) computer(s) and the vehicle or vessel computers.

It should be understood with respect to all of the embodiments described herein that power supplies having the correct polarities and magnitudes are provided where not indicated in the drawings so as to supply the proper electrical energy for appropriately operating the various illustrated components and circuits as described in the specification.

We claim:

1. A navigational warning system comprising in combination:

an earth satellite positioned in orbit above the earth, first means located with said satellite for scanning and receiving information indicative of the locations of vessels traveling a body of water on which navigation is conducted, second means connected to said first means for generating output information signals which are indicative of locations of a pluraluty of vessels traveling said body of water, third means for processing said output information signals, fourth means including an electronic computer for performing data processing operations with respect to signals generated by said third means, a memory associated with said computer containing recordings of information defining the locations of certain fixed navigational hazards, such as shoals, reefs, wrecks and other hazards existing within said body of water, said computer being operable to compare the locations of vessels detected by said first means with the locations of said navigational hazards defined by the information recorded in said memory and including means operable to generate output signals indicative of the navigation hazards which exist in the paths of vessels traveling said body of water, fifth means for short wave transmitting said output signals to earth, and short wave receiving means located on vessels traveling said body of water for receiving short wave signals transmitted by said short wave transmitting means of said earth satellite, and warning means connected to said shortwave receiving means of said vessels receiving said shortwave signals which are indicative of specific hazards, for providing a warning indication of hazardous conditions along the route of each of said vessels.

2. A navigational warning system in accordance with claim 1 including navigational correction means operable with respect to at least certain of said ships for automatically correcting the course of travel of selected ships to permit said ships to avoid hazards en route.

3. A navigational warning system in accordance with claim 1 wherein said electronic computer is operable to process digital signals derived from information generated by said first means and to determine therefrom the locations of additional hazardous condition other than said fixed hazards, such as storms and hazardous conditions defined when vessels on said body of water are on a collision course with other vessels located in the field scanned by said first means, said computer being operable to generate output signals indicative of such additional hazards and to present such additional hazard indicating output signals to said short wave transmitting means for transmission thereby to earth for receipt and use by at least certain of said vessels.

4. A navigational warning system in accordance with claim 1 including sixth means for generating and short wave transmitting from said satellite a plurality of first signals defining hazards and second signals defining the locations of such hazards.

5. A system in accordance with claim 1 wherein said electronic computer includes first circuit means for further processing digital signals generated by said third means and further electrical circuit means for detecting when vessels are on a collision course and generating collision warning signals, said further circuit means being connected to effect short wave transmission of such collision warning signals.

6. A navigation and warning system for use in guiding and warning ocean going vessels of hazardous conditions comprising in combination:
   an earth satellite disposed in stationary orbit above the earth,
   scanning means supported by said satellite for scanning and receiving information defining the locations of vessels traveling an ocean and generating information signals representative of the respective locaions of said vessels,
   computer analyzing means for receiving said information signals and generating output signals which are indicative of the locations of ocean going vessels traveling the ocean under surveillance,
   shortwave transmitting means for receiving and shortwave transmitting said information signals, and
   indicating means on said vessels connected to the receiving means thereof for indicating the relative positions of the vessels in the vicinity of the vessels which receive shortwave signals transmitted from said ·satellite in accordance with the shortwave signals received.

7. A system in accordance with claim 6 wherein said indicating means is operable to intelligibly indicate information defining the distance between the vessel containing a receiving and indicating means and one or more other vessels within a given range of said vessel.

8. A system in accordance with claim 7 wherein said indicating means includes an alarm for indicating when an unsafe navigation condition develops with respect to the vessel containing said indicating means.

9. A system in accordance with claim 8 wherein said alarm indicating means is operable for indicating when the vessel containing said alarm indicating means is on a collision course with another vessel.

10. A system in accordance with claim 6 including an electronic memory containing stored therein signals which are indicative of hazardous navigational conditions such as reefs, wrecks, shoals and other geographical conditions, which hazardous conditions may result in damage to or the destruction of a particular vessel, said computer being located on said particular vessel and connected to said short wave receiving means for receiving information generated by the scanning means of the satellite and indicative of the location and direction of travel of the vessel, said computer being operable to generate output signals which are indicative of the approach of said vessel to a hazardous area and means on said vessel operable when said vessel approaches a hazardous condition to respond to said latter signals for indicating the approach of such hazardous condition.

11. A system in accordance with claim 10 including corrective action generating means supported by a vessel and responsive to the signals generated which are indicative of the approach of a hazardous condition for changing the course of the vessel to avoid such hazardous condition.

12. A system in accordance with claim 6 including a memory for recording information defining the positions of various vessels in the area scanned by the scanning means of the satellite and the positions of hazardous conditions in such scanned area, and means located on a vessel for generating codes for querying said memory and causing said memory to generate signals which are transmitted to the receiving means of the vessel and means located on said vessles containing said receiving means for displaying the information received from said satellite and indicating the locations of other vessels and hazardous conditions within a given range of said vessel.

13. A method of warning ships at sea of hazardous navigating conditions comprising:
   recording information defining certain hazardous navigating conditions existing within a particular navigatable portion of a body of water in a memory together with recordings of the locations of such hazardous conditions,
   electronically generating information signals indicative of the locations and movements of vessels traveling such body of water,
   presenting said information signals to a computer and processing same in said computer in accordance with information recorded in said memory in a manner to determine when a vessel traveling said body of water is on a course such that it will be subject to a hazardous condition existing enroute along such course,
   automatically generating a warning signal indicative of such hazardous condition, shortwave transmitting such warning signal from a location remote from said vessel,
   receiving the shortwave transmitted warning signal by a shortwave receiver located on said vessel traveling said course, and
   applying the received warning signal to activate a warning device for warning personnel on the vessel of the hazardous condition.

14. A method in accordance with claim 13 wherein the warning device on the vessel is operable to provide a variable visual indication of the nature of the hazardous condition.

15. A method in accordance with claim 14 wherein the warning device also is operable to provide a visual indicating means for indicating the position of the vessel and the hazardous condition so as to indicate to a person monitoring such warning device as to the imminency of the hazardous condition and to permit such person to take proper action to properly account for and avoid the hazardous condition.

16. A method in accordance with claim 13 wherein the electronic scanning step is effected by electro-optically scanning the body of water by the use of a telescope supported by an earth satellite disposed in stationary orbit above the earth and said short wave signals are transmitted from said earth satellite to said receiver on said vessel.

17. A method in accordance with claim 16 including generating a code signal, which code signal is indicative of one or more vessels traveling the body of water being scanned and short wave transmitting said code signal together with said warning signal indicative of a hazardous condition existing enroute for a vessel traveling said body of water, and receiving said code signal by said receiving means on said vessel and employing the received code signal to condition the receiving means to receive and apply the warning signal to said visual display means.

18. A method of navigating comprising:
recording in a memory information defining the locations of generally stationary objects and terrestrial conditions defining hazards to navigation of a vessel when traveling in the general vicinity of said generally stationary objects and terrestrial conditions, causing a vessel to initiate travel in a first path and direction such that it may intersect or collide with an object or terrestrial condition, the location of which is recorded in said memory, periodically scanning a select portion of the surface of the earth with a detector located in an earth satellite and generating electrical signals containing information defining the locations of such generally stationary objects and terrestrial conditions and said vessel, computer processing such signals and comparing the results of such processing with information derived from said memory and defining the locations of such hazardous conditions, generating warning signals when the immediate path of travel of said vessel is such as to cause the vessel to be subject to the hazardous condition, and applying such warning signals to effect correction in the path of travel of the vessel to avoid the hazardous condition.

19. A method in accordance with claim 18 wherein the warning signal is applied to provide a warning indication to a person navigating said vessel of the hazardous condition so as to permit such person to take evasive action.

20. A method in accordance with claim 18 wherein said warning signal is applied to automatically control the travel of said vessel so as to effect a variation in the path travelled thereby to avoid a hazard when such hazard is in the path of travel of such vessel.

* * * * *